United States Patent [19]

Burkhart et al.

[11] Patent Number: 5,306,737
[45] Date of Patent: Apr. 26, 1994

[54] POLYSILOXANE-POLYOXYALKYLENE BLOCK COPOLYMERS WITH DIFFERENT POLYOXYALKYLENE BLOCKS IN THE AVERAGE MOLECULE

[75] Inventors: Georg Burkhart, Essen; Rolf-Dieter Langenhagen, Hattingen-Niederwenigern; Andreas Weier, Essen; Volker Zellmer, Bottrop, all of Fed. Rep. of Germany

[73] Assignee: Th. Goldschmidt AG, Essen, Fed. Rep. of Germany

[21] Appl. No.: 112,504

[22] Filed: Aug. 26, 1993

[30] Foreign Application Priority Data

Sep. 3, 1992 [DE] Fed. Rep. of Germany ....... 4229402

[51] Int. Cl.$^5$ ............................................. C08G 8/00
[52] U.S. Cl. ................................... 521/112; 521/155; 521/174; 556/445
[58] Field of Search ................ 521/112, 124, 155

[56] References Cited

U.S. PATENT DOCUMENTS 4,855,329  8/1989  Blevins et al. .................. 521/112
5,145,879  9/1992  Budnik et al. .................. 521/112

FOREIGN PATENT DOCUMENTS 0275563  7/1988  European Pat. Off. .
1570647  6/1970  Fed. Rep. of Germany .
1694366  11/1970  Fed. Rep. of Germany .
2541865  4/1976  Fed. Rep. of Germany .

Primary Examiner—Morton Foelak
Attorney, Agent, or Firm—Anderson Kill Olick & Oshinsky

[57] ABSTRACT

Polysiloxane-polyoxyalkylene block copolymers having different polyoxyalkylene blocks in the average molecule are prepared. The mixture of the polyoxyalkylene blocks consists of at least one polyoxyalkylene group A and at least one polyoxyalkylene group B and/or at least one polyoxyalkylene group C, each polyoxyalkylene group A having an average molecular weight of 600 to 5,500 and consisting of 20 to 90% by weight of oxyethylene units and 80 to 10% by weight of oxypropylene units, polyoxyalkylene group B having an average molecular weight of 500 to 5,000 and consisting of 2 to 19% by weight of oxyethylene units and 98 to 81% by weight of oxypropylene units, polyoxyalkylene group C having an average molecular weight of 1,500 to 4,500 and consisting of oxypropylene units. Up to 20% by weight of the oxypropylene units is replaceable by oxybutylene units and the molar ratio of polyoxyalkylene groups A to the sum of the polyoxyalkylene groups B and C is 1:4 to 4:1. The block copolymers are highly effective stabilizers for the production of flexible polyurethane foams with an excellent ratio of cell fineness of the foam to air permeability of the foam.

2 Claims, No Drawings

POLYSILOXANE-POLYOXYALKYLENE BLOCK COPOLYMERS WITH DIFFERENT POLYOXYALKYLENE BLOCKS IN THE AVERAGE MOLECULE

FIELD OF INVENTION

The invention relates to polysiloxane-polyoxyalkylene block copolymers with different polyoxyalkylene blocks in an average molecule and their use in the production of polyurethane foams.

BACKGROUND INFORMATION AND PRIOR ART

For the production of polyurethane foams, polysiloxane-polyoxyalkylene block copolymers, which enable a uniform pore structure to be formed and stabilize the foam formed up to the end of the reaction, are added to the reaction products. However, not all polysiloxane-polyoxyalkylene block copolymers are equally suitable. In order to be useful as polyurethane foam stabilizers, the polyoxyalkylene blocks and the polysiloxane block of the block copolymers must be present in a well-balanced ratio. Moreover the structure of the two blocks is also of great importance. For the structure of an as effective a foam stabilizer as possible, there is a plurality of variables for the polyoxyalkylene block as well as for the polysiloxane block.

The polyoxyalkylene block may be composed of different oxyalkylene units, particularly of oxyethylene, oxypropylene and oxybutylene units. Moreover, the ratio by weight of these units to one another, as well as the molecular weight of the polyoxyalkylene block can be varied. The end group of the polyoxyalkylene block, which can be a reactive group (such as an OH group), or inert (such as an alkoxy group) with respect to the polyurethane formation, is also of importance. The polyoxyalkylene block can be linked to the polysiloxane block by a hydrolytically stable C-Si bond or by the hydrolytically less stable C-O-Si bond. Furthermore, different polyoxyalkylene blocks can also be linked to the polysiloxane block.

The polysiloxane block can be varied with respect to the nature and proportion of the silicon units. The siloxane block can be linear or branched and have different molecular weights. The polyoxyalkylene blocks can be linked terminally and/or laterally to the polysiloxane block.

The effectiveness of a polysiloxane-polyoxyalkylene block copolymer as a foam stabilizer can be predicted only to a limited extent. The expert is therefore required to investigate the possible variations largely empirically. In view of the large, almost indeterminable number of possible variations, the finding of special variation possibilities and corresponding block copolymers represents a progressive and thus inventive effort.

Polysiloxane-polyoxyalkylene block copolymers, which have different polyoxyalkylene groups in the average molecule, have already been described in numerous publications. Of the large number of corresponding publications, the following are named as being representative:

German Patent 15 70 647: Chloropolysiloxanyl sulfates are reacted with mixtures of alkylene oxide adducts, which consist of
- 50 to 95 OH-equivalent percent of polyalkylene glycol monoethers, which consist of ethylene oxide and propylene oxide units and contain 40 to 70% by weight of oxypropylene units and have a molecular weight of 1,000 to 3,000 and the hydroxyl groups of which preferably are secondary, and
- 5 to 50 OH-equivalent percent of alkylene oxide adducts of multihydric hydroxyl compounds having a molecular weight of 130 to 3,500, the polyalkylene glycol component of which consists of ethylene oxide and/or oxidepropylene units and which have an OH equivalent weight of up to 1,750 and the hydroxyl groups of which are predominantly secondary, the ratio by weight being selected so that there is at most 1.4 and preferably 1.05 to 1.2 OH equivalents per acid equivalent of the chloropolysiloxanyl sulfate.

German Patent 16 94 366: Those polysiloxane-polyoxyalkylene block copolymers are used as foam stabilizers, the polysiloxane block of which is built up in a known manner and the polyoxyalkylene block of which, however, consists of
- 25 to 70% by weight of a polyoxyalkylene with an average molecular weight of 1,600 to 4,000 and an ethylene oxide content of 20 to 100% by weight, the remainder being propylene oxide and optionally higher alkylene oxides, and
- 30 to 75% by weight of a polyoxyalkylene with an average molecular weight of 400 to 1,200 and an ethylene oxide content of 65 to 100% by weight, the remainder being propylene oxide and optionally higher alkylene oxides.

German Offenlegungsschrift 25 41 865: The polysiloxane-polyoxyalkylene block copolymers are defined with respect to their polyoxyalkylene block so that the one polyoxyalkylene block has an average molecular weight of 900 to 1,300 and consists of up to 30 to 55% by weight of ethylene oxide, the remainder being propylene oxide, and the other polyoxyalkylene block has an average molecular weight of 3,800 to 5,000 and consists of 30 to 50% by weight of ethylene oxide, the remainder being propylene oxide.

European Publication 0 275 563: The block copolymer, described in this published European patent application, comprises three different polyoxyalkylene blocks, namely a block, which contains 20 to 60% by weight of oxyethylene units and has a molecular weight of 3,000 to 5,500, a further block with 20 to 60% by weight of oxyethylene units and a molecular weight of 800 to 2,900 and a third block which consists only of polyoxypropylene units and has a molecular weight of 130 to 1,200.

OBJECT OF THE INVENTION

An object of the present invention is polysiloxane-polyoxyalkylene block copolymer. The application properties of these copolymers are further optimized, a special effort being made to find a stabilizer of high activity which permits flexible polyurethane foams of very good cell fineness to be produced even in the lower density range.

BRIEF DESCRIPTION OF THE INVENTION

This improvement in the application properties was found in those polysiloxane-polyoxyalkylene block copolymers which, pursuant to the invention, correspond to the following, general, average formula:

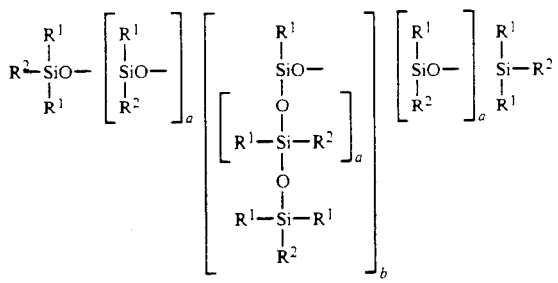

wherein
$R^1$ is an alkyl group with 1 to 4 carbon atoms or a phenyl group, with the proviso that at least 90% of the $R^1$ groups are methyl groups, $R^2$ has the same meaning as $R^1$ or represents the $-M-R^3$ group, in which M is a divalent group of the formula $-R^4_xO-$ wherein $R^4$ is a divalent alkylene group, which may also be branched and x has a value of 0 or 1, $R^3$ is a mixture of (1) at least one polyoxyalkylene group A and
(2) at least one polyoxyalkylene group B and/or
(3) at least one polyoxyalkylene group C, wherein each polyoxyalkylene group A has an average molecular weight of 600 to 5,500 and consists of 20 to 90% by weight of oxyethylene units and 80 to 10% of oxypropylene units, polyoxyalkylene group B has an average molecular weight of 500 to 5,000 and consists of 2 to 19% by weight of oxyethylene units and 98 to 81% by weight of oxypropylene units, polyoxyalkylene group C has an average molecular weight of 1,500 to 4,500 and consists of oxypropylene units, it being possible in each case to replace up to 20% by weight of the oxypropylene units by oxybutylene units and the molar ratio of the polyoxyalkylene groups A to the sum of the polyoxyalkylene groups B and C being 1:4 to 4:1, with the proviso that, in the average bock copolymer, at least one $R^3$ group is present, b has a value of 0 to 10, a has a value of 10 to 100, when b=0, or a value of 3 to 70, when b>0 and $\leq 4$, or a value of 3 to 30, when b>4.

An important characteristic of the present invention consists in the nature and amount of the polyoxyalkylene groups linked to the polysiloxane backbone, for which the following combinations are possible:

| Possibility | POA-Block A | POA-Block B | POA-Block C |
|---|---|---|---|
| I | + | + | + |
| II | + | + | − |
| III | + | − | + |

Possibilities I and II are preferred.

The $R^1$ group preferably is a methyl group.

The M group preferably is a group of formula $-(CH_2)_2-$ or $-(CH_2)_3-$.

Preferably, the polyoxyalkylene blocks $R^3$ correspond to the formula $(C_mH_{2m}O-)_nR^5$, wherein the subscripts n and m are selected so that the conditions with respect to the composition and the molecular weight of the different polyoxyalkylene blocks are fulfilled, and $R^5$ is a hydrogen group, an alkyl group with 1 to 4 carbon atoms, an acyl group or an $-O-CO-NH-R^6$ group, wherein $R^6$ is an alkyl or aryl group.

The following are the preferred ranges for the polyoxyalkylene groups:

polyoxyalkylene group A: average molecular weight of 1,000 to 4,000, ethylene oxide content of 30 to 60, content of propylene oxide and optionally higher alkylene oxides from 70 to 40, polyoxyalkylene group B: average molecular weight of 800 to 2,500 ethylene oxide content of 5 to 15, content of propylene oxide and optionally higher alkylene oxides from 95 to 85, and polyoxyalkylene group C: average molecular weight 1,500 to 2,500.

Blocks A, B and C may be present several times and linked to a common, average molecule. In the event that the polyoxyalkylene groups A, B and/or C are present several times, the polyoxyalkylene groups of the individual types of blocks must not be identical with one another. Blocks A, B or C must correspond only to the respective conditions for the individual block types.

Preferably, the molar ratio of the polyoxyalkylene groups A to the sum of the polyoxyalkylene groups B and C is 1:3 to 3:1.

The inventive block copolymer can be synthesized by known methods. If the polyoxyalkylene blocks are linked to the polysiloxane backbone by an SiC bond, polyoxyalkylene ethers of alcohols with an olefinic double bond are added to an SiH group of a hydrogensiloxane in the presence of hydrosilylating catalysts, particularly platinum catalysts. If the polyoxyalkylene blocks are linked by means of an SiOC bond with the polysiloxane backbone, chloropolysiloxanyl sulfates are reacted with polyether monools with neutralization of the mineral acid released. It is also possible to transesterify appropriate alkoxysiloxanes with polyether monools. Appropriate synthesis methods are described in the literature described in the beginning.

The inventive polysiloxane-polyoxyalkylene block copolymers have outstanding application properties and can also be used in combination with other stabilizers of the state of the art. The flexible foams, produced with these polymers as foam stabilizers, exhibit an outstanding relationship between cell fineness and air permeability.

The stabilizers are used in the customary amounts for the production of polyurethane foams, usually in an amount of, for example, about 0.3 to 2.5% by weight based on the polyol and preferably in amount of 0.8 to 1.5% by weight.

In the following Examples, the application properties of the inventive polymers are explained in even greater detail, it being understood that the Examples are offered by way of illustration and not by way of limitation.

EXAMPLE 1

To a flask equipped with a stirrer, thermometer, gas inlet and stillhead, are added 201.2 g (=0.05 moles) of a polyether having the average formula

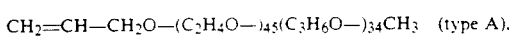

18.4 g (=0.012 moles) of a polyether having the average formula $CH_2=CH-CH_2O-(C_2H_4O-)_{16}(C_3H_6O-)_{12}CH_3$ (type A).

94.4 g (=0.062 moles) of a polyether having the average formula $CH_2=CH-CH_2O-(C_2H_4O-)_5(C_3H_6O-)_{21}CH_3$ (type B)

and 450 mL of toluene. For azeotropically drying the polyether mixture, 150 mL of toluene are distilled off under a blanket of nitrogen. After that, the flask is equipped with a reflux condenser and a dropping funnel and nitrogen continues to be passed through the apparatus. At a temperature of 105° C., 0.2 g of a 10% solution of $H_2PtCl_6·6H_2O$ in i-propanol is added and stirred in for 5 minutes. After that, 80.4 g (=0.1 mole SiH) of a siloxane having the average formula $(CH_3)_3SiO-[(CH_3)_2SiO-]_{58}[(CH_3)HSiO-]_6-Si(CH_3)_3$ are added dropwise over a period of 20 minutes. The reaction conditions are maintained for 4 hours, an SiH conversion of 98.3% being obtained (determined by means of the hydrogen that can be split off in an alkaline medium with n-butanol). The formulation is mixed with 2 g of bentonite, stirred for 30 minutes and filtered. The toluene is subsequently distilled off at 80° C. and 20 mbar. A clear, yellowish product with a viscosity of 1740 mPa x sec is obtained.

EXAMPLE 2

To a flask equipped with a dropping funnel, stirrer, thermometer, gas inlet and reflux condenser, are added 251.5 g (=0.063 moles) of a polyether having the average formula $CH_2=CH-CH_2O-(C_2H_4O-)_{45}(C_3H_6O-)_{34}CH_3$ (type A).

56.6 g (=0.038 moles) of a polyether having the average formula $CH_2=CH-CH_2O-(C_2H_4O-)_5(C_3H_6O-)_{21}CH_3$ (type B).

37.7 g (=0.025 moles) of a polyether having the average formula $CH_2=CH-CH_2O-(C_2H_4O-)_1(C_3H_6O-)_{24}CH_3$ (type B)

and 15 mg of $C_2H_4·C_5H_5N·PtCl_2$. Nitrogen is passed through the apparatus. After the temperature is raised to 120° C., 65.5 g (=0.1 moles SiH) of a siloxane with the average formula $H(CH_3)_2SiO-[(CH_3)_2SiO-]_{80}[(CH_3)HSiO-]_8-Si(CH_3)_2H$ is added dropwise. The reaction conditions are maintained for 2.5 hours, after which the SiH conversion is 99.2%. Subsequently, the product is mixed at 80.C. with 3.3 g of bentonite, stirred for 30 minutes and filtered. A clear, yellowish product with a viscosity of 2180 mPa x sec is obtained.

EXAMPLE 3

To a flask equipped with a stirrer, thermometer, gas inlet and reflux condenser are added 196.0 g (=0.05 moles) of a polyether having the average formula $CH_2=CH-CH_2O-(C_2H_4O-)_{42}(C_3H_6O-)_{34}COCH_3$ (type A).

28 1 g (=0.019 moles) of a polyether having the average formula $CH_2=CH-CH_2O-(C_2H_4O-)_{16}(C_3H_6O-)_{12}COCH_3$ (type A).

84.8 g (=0.056 moles) of a polyether having the average formula $CH_2=CH-CH_2O-(C_2H_4O-)_1(C_3H_6O-)_{24}CH_3$ (type B).

and 87.7 g (=0.1 moles SiH) of a siloxane having the average formula
$(CH_3)_3SiO-[(CH_3)_2SiO-]_{130}[(CH_3)HSiO]_{12}Si(CH_3)_3$.

Nitrogen is passed through the apparatus. After the temperature is raised to 110° C., 15 mg of cis-$[PtCl_2(NH_3)_2]$ are added. After a slightly exothermic reaction, the formulation becomes clear. The reaction conditions are maintained for 4 hours, after which the SiH conversion is 99.8%. Finally the product is mixed at 80° C. with 2 g of bentonite, stirred for 30 minutes and filtered. A clear, yellowish product with a viscosity of 1,910 mPa x sec is obtained.

EXAMPLE 4

To a flask equipped with a stirrer, thermometer, gas inlet and stillhead, 188.5 g (0.055 moles) of a polyether having the average formula $C_4H_9O-(C_2H_4O)_{38}(C_3H_6O-)_{29}H$ (type A).

59.2 g (=0.033 moles) of a polyether having the average formula $C_4H_9O-(C_2H_4O-)_{18}(C_3H_6O-)_{16}H$ (type A).

30.7 g (=0.022 moles) of a polyether having the average formula $C_4H_9O-(C_2H_4O-)_5(C_3H_6O-)_{19}H$ (type B)

and 1.100 mL of toluene are added. Under a blanket of nitrogen, 150 mL of toluene are distilled off for the azeotropic drying of the polyether mixture. At 50.C., the stillhead is exchanged for a reflux condenser. Subsequently, 65.8 g (0.1 moles SiX) of a chloropolysiloxanyl sulfate having the average formula

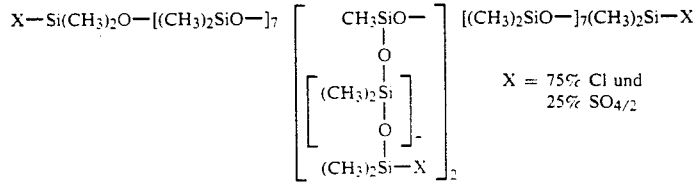

are added. Ammonia gas is then passed at 60.C. untll the contents of the flask react positively with ammonia.

The reaction is allowed to continue for a further hour, while ammonia gas is being passed in slowly. Subsequently, the precipitated salt is filtered off. After that, the toluene is distilled off at 70° C. and 20 mbar. A light brown, almost clear product with a viscosity of 1,320 mPa x sec is obtained.

EXAMPLE 5

Corresponding to conditions of Example 1, 12.1 g (=0.013 moles) of a polyether having the average formula $$CH_2=CH-CH_2O-(C_2H_4O-)_{15}(C_3H_6O-)_4CH_3 \quad \text{(type A)},$$

69.9 g (=0.05 moles) of a polyether having the average formula $$CH_2=CH-CH_2O-(C_2H_4O-)_{12}(C_3H_6O-)_{14}H \quad \text{(type A)},$$

and 94.3 g (=0.063 moles) of a polyether having the average formula $$CH_2=CH-CH_2O-(C_2H_4O-)_1(C_3H_6O-)_{24}CH_3 \quad \text{(type B)}$$

are reacted with 87.7 g (=0.1 mole SiH) of a siloxane having the average formula
$(CH_3)_3SiO-[(CH_3)_2SiO-]_{130}[(CH_3)HSiO-]_{1.2}Si(CH_3)_3$
with addition of 400 mL of toluene (of this amount, 150 mL for azeotropic drying) in the presence of 0.16 g of a 10% solution of $H_2PtCl_6 \cdot 6 H_2O$ in i-propanol. An SiH conversion of 97.9% is attained. The product is clear and yellowish and has a viscosity of 1,480 mPa x sec.

EXAMPLE 6

Corresponding to conditions of Example 1, 73.6 g (=0.05 moles) of a polyether having the average formula $$CH_2=CH-CH_2O-(C_2H_4O-)_{16}(C_3H_6O-)_{12}CH_3 \quad \text{(type A)},$$

201.2 g (=0.05 moles) of a polyether having the average formula $$CH_2=CH-CH_2O-(C_2H_4O-)_{45}(C_3H_6O-)_{34}CH_3 \quad \text{(type A)}$$

and 38.1 g (=0.025 moles) of a polyether having the average formula $$CH_2=CH-CH_2O-(C_3H_6O-)_{25}CH_3 \quad \text{(type C)}$$

are reacted with 87.7 g (=0.1 mole SiH) of a siloxane having the average formula $(CH_3)_3SiO-[(CH_3)_2SiO-]_{130}[(CH_3)HSiO-]_{1.2}Si(CH_3)_3$ with addition of 470 mL of toluene (of this amount, 150 mL for azeotropic drying) in the presence of 0.25 g of a 10% solution of attained. The product is clear and yellowish and has a viscosity of 1,870 mPa x sec.

EXAMPLE 7

Corresponding to the conditions of Example 1, 19.4 g (=0.0125 moles) of a polyether having the average formula $$CH_2=CH-CH_2O-(C_2H_4O-)_{23}(C_3H_6O-)_8CH_3 \quad \text{(type A)},$$

73.6 g (=0.05 moles) of a polyether having the average formula $$CH_2=CH-CH_2O-(C_2H_4O-)_{16}(C_3H_6O-)_{12}CH_3 \quad \text{(type A)},$$

75.5 g (=0.05 moles) of a polyether having the average formula $$CH_2=CH-CH_2O-(C_2H_4O-)_5(C_3H_6O-)_{21}CH_3 \quad \text{(type B)}$$

and 32.1 g (=0.0125 moles) of a polyether having the average formula $$CH_2=CH-CH_2O-(C_3H_6O-)_{43}CH_3 \quad \text{(type C)}$$

are reacted with 87.7 g (=0.1 mole SiH) of a siloxane having the average formula $(CH_3)_3SiO-[(CH_3)_2SiO-]_{130}[(CH_3)HSiO-]_{1.2}Si(CH_3)_3$ with addition of 400 mL of toluene (of this amount, 150 mL for azeotropic drying) in the presence of 0.2 g of a 10% solution of $H_2PtCl_6 \cdot 6 H_2O$ in i-propanol. An SiH conversion of 98.4% is attained. The product is clear and yellowish and has a viscosity of 1,310 mPa x sec.

EXAMPLE 8

Corresponding to the conditions of Example 1, 122.5 g (=0.031 moles) of a polyether having the average formula $$CH_2=CH-CH_2O-(C_2H_4O-)_{42}(C_3H_6O-)_{3.4}COCH_3 \quad \text{(type A)},$$

and 141.6 g (=0.094 moles) of a polyether having the average formula $$CH_2=CH-CH_2O-(C_2H_4O-)_5(C_3H_6O-)_{21}CH_3 \quad \text{(type B)}$$

are reacted with 87.7 g (=0.1 mole SiH) of a siloxane having the average formula $(CH_3)_3SiO-[(CH_3)_2SiO-]_{130}[(CH_3)HSiO-]_{1.2}Si(CH_3)_3$ with addition of 450 mL of toluene (of this amount, 150 mL for azeotropic drying) in the presence of 0.2 g of a 10% solution of $H_2PtCl_6 \cdot 6 H_2O$ in i-propanol. An SiH conversion of 96.8% was attained. The product is clear and yellowish and has a viscosity of 1,165 mPa x sec.

EXAMPLE 9

(Not of the Invention)

Corresponding to the conditions of Example 1, 201.2 g (=0.05 moles) of a polyether having the average formula $$CH_2=CH-CH_2O-(C_2H_4O-)_{45}(C_3H_6O-)_{34}CH_3 \quad \text{(type A)},$$

and 110.4 g (=0.075 moles) of a polyether having the average formula $$CH_2=CH-CH_2O-(C_2H_4O-)_{16}(C_3H_6O-)_{12}CH_3 \quad \text{(type A)}$$

are reacted with 110 g (=0.1 mole SiH) of a siloxane having the average formula
$(CH_3)_3SiO-[(CH_3)_2SiO-]_{96}[(CH_3)HSiO-]_7Si(CH_3)_3$
with addition of 450 mL of toluene (of this amount, 150 mL for azeotropic drying) in the presence of 0.3 g of a 10% solution of $H_2PtCl_6 \cdot 6 H_2O$ in i-propanol. An SiH conversion of 98.9% was attained. The product is clear and yellowish and has a viscosity of 2,620 mPa x sec.

EXAMPLE 10

Corresponding to the conditions of Example 1, 201.2 g (=0.05 moles) of a polyether having the average formula $$CH_2=CH-CH_2O-(C_2H_4O-)_{45}(C_3H_6O-)_{34}CH_3 \quad \text{(type A)}.$$

73.6 g (=0.05 moles) of a polyether having the average formula $$CH_2=CH-CH_2O-(C_2H_4O-)_{16}(C_3H_6O-)_{12}CH_3 \quad \text{(type A)}$$

and 24.1 g (=0.025 moles) of a polyether having the average formula $$CH_2=CH-CH_2O-(C_2H_4O-)_{15}(C_3H_6O-)_4CH_3 \quad \text{(type A)}$$

are reacted with 87.7 g (=0.1 mole SiH) of a siloxane having the average formula
$(CH_3)_3SiO-[(CH_3)_2SiO-]_{130}[(CH_3)HSiO-]_{12}Si(CH_3)_3$ with addition of 500 mL of toluene (of this amount, 150 mL for azeotropic drying) in the presence of 0.3 g of a 1% solution of $H_2PtCl_6 \cdot 6\ H_2O$ in i-propanol. An SiH conversion of 98.5% was attained. The product is clear and yellowish and has a viscosity of 2,450 mPa x sec.

EXAMPLE 11

Corresponding to the conditions of Example 1, 201.2 g (=0.05 moles) of a polyether having the average formula $$CH_2=CH-CH_2O-(C_2H_4O-)_{45}(C_3H_6O-)_{34}CH_3 \quad \text{(type A)}.$$

73.6 g (=0.05 moles) of a polyether having the average formula $$CH_2=CH-CH_2O-(C_2H_4O-)_{16}(C_3H_6O-)_{12}CH_3 \quad \text{(type A)}$$

and 35 g (=0.025 moles) of a polyether having the average formula $$CH_2=CH-CH_2O-(C_2H_4O-)_{12}(C_3H_6O-)_{14}H \quad \text{(type A)}$$

are reacted with 80.4 g (=0.1 mole SiH) of a siloxane having the average formula $$(CH_3)_3SiO-[(CH_3)_2SiO-]_{58}[(CH_3)HSiO-]_6-Si(CH_3)_3$$

with addition of 500 mL of toluene (of this amount, 150 mL for azeotropic drying) in the presence of 0.25 g of a 10% solution of $H_2PtCl_6 \cdot 6\ H_2O$ in i-propanol. An SiH conversion of 98.2% was attained. The product is clear and yellowish and has a viscosity of 1,980 mPa x sec.

The application of the foam stabilizers synthesized was tested with a foam formulation in the following manner:

In each case, 300 parts of a conventional, commercial polyether for the production of flexible urethane foams, which has three hydroxyl groups in the average molecule and a molecular weight of 3,500, are mixed with good stirring with 15 parts of water, 30 parts of a physical blowing agent, the appropriate amount of foam stabilizer to be tested, 0.33 parts of diethylenetriamine and 0.6 parts of tin octoate. After addition of 125 parts of toluene diisocyanate (a 4:1 mixture of the 2,4 and 2,6 isomers), the mixture is stirred with a plain stirrer for 7 seconds at 3000 rpm and poured into a box. A fine-pored foam is formed, from which the following data are obtained:

1. The sagging of the foam at the end of the rise phase (referred to in the following Table as "collapse")
2. The head pressure, encountered on pressing air through a 10×10×10 cm cube cut from the center of the foam, is determined. The open celled nature of the resulting foam varies inversely with the head pressure measured.
3. The number of cells per centimeter of foam are counted under a microscope.

In the following Table, three measured values are given for three different concentrations in the ratio of 1.8:1.3:1.0, for inventive stabilizers (Examples 1 to 8) as well as for stabilizers that are not of the invention (Examples 9 to 11).

TABLE 1

| Example | Collapse | Head Pressure | Cells per cm |
| --- | --- | --- | --- |
| 1 | 0.6/0.7/1.2 | 27/17/17 | 15/15/15 |
| 2 | 0.9/1.3/1.9 | 20/11/8 | 16/15/15 |
| 3 | 0.7/0.7/1.4 | 25/19/16 | 15/15/13 |
| 4 | 1.1/1.5/2.1 | 41/28/22 | 16/16/14 |
| 5 | 0.5/0.9/1.5 | 300/254/220 | 13/12/12 |
| 6 | 0.6/0.8/2.0 | 25/22/15 | 13/13/12 |
| 7 | 2.1/2.5/3.3 | 31/25/22 | 16/15/13 |
| 8 | 3.0/3.2/3.6 | 19/09/07 | 15/15/15 |
| 9 | 0.8/0.9/1.5 | 45/35/30 | 12/12/10 |
| 10 | 0.6/0.9/1.4 | 50/55/65 | 10/08/08 |
| 11 | 0.6/0.8/0.9 | 80/102/125 | 09/08/05 |

As is evident from the application data, flexible polyurethane foams with a very fine cell structure can be produced with foam stabilizers having the inventive structure, the foams showing only little collapse because of the activity of the stabilizer.

EXAMPLE 12

A further comparison of two inventive foam stabilizers with a foam stabilizer of the European publication 0 275 563 is carried out as follows:
1. Synthesis of the inventive stabilizers a) and b)
Stabilizer a)

Corresponding to the conditions of Example 1, 73.6 g (=0.05 moles) of a polyether having the average formula $$CH_2=CH-CH_2O-(C_2H_4O-)_{16}(C_3H_6O-)_{12}CH_3$$

corresponding to the polyoxyalkylene group A as described above on page 7 (having a molecular weight of 1472), 125.3 g (=0.03125 moles) of a polyether having the average formula
$CH_2=CH-CH_2O-(C_2H_4O-)_{45}(C_3H_6O-)_{34}H$
corresponding to the polyoxyalkylene group A as described above on page 7 (with a molecular weight of 4,010) and 122.3 g (=0.04375 moles) of a polyether having the average formula $$CH_2=CH-CH_2O-(C_3H_6O-)_{47}CH_3$$

corresponding to the polyoxyalkylene group C, as described above on page 7 (with a molecular weight of 2798) are reacted with 80.4 g (=0.1 mole SiH) of a siloxane having the average formula $$(CH_3)_3SiO-[(CH_3)_2SiO-]_{58}[(CH_3)HSiO-]_6-Si(CH_3)_3$$

with addition of 450 mL of toluene (of this amount, 150 mL for azeotropic drying) in the presence of 0.25 g of a 10% solution of $H_2PtCl_6 \cdot 6\ H_2O$ in i-propanol. An SiH conversion of 99.1% was attained. The product is clear and yellowish and has a viscosity of 1,950 mPa x sec.

Stabilizer b)

Corresponding to the conditions of Example 1, 73.6 g (=0.05 moles) of a polyether having the average formula

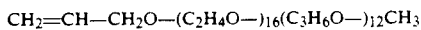
CH$_2$=CH—CH$_2$O—(C$_2$H$_4$O—)$_{16}$(C$_3$H$_6$O—)$_{12}$CH$_3$ corresponding to the polyoxyalkylene group A as described above on page 7 (with a molecular weight of 1472), 125.3 g (=0.03125 moles) of a polyether having the average formula

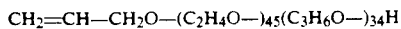
CH$_2$=CH—CH$_2$O—(C$_2$H$_4$O—)$_{45}$(C$_3$H$_6$O—)$_{34}$H corresponding to the polyoxyalkylene group A as described above on page 7 (with a moleCular weight of 4010) and 66.6 g (=0.04375 moles) of a polyether having the average formula

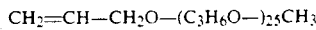
CH$_2$=CH—CH$_2$O—(C$_3$H$_6$O—)$_{25}$CH$_3$ corresponding to the polyoxyalkylene group C as described above on page 7 (with a molecular weight of 1522) are reacted with 80.4 g (=0.1 mole SiH) of a siloxane having the average formula

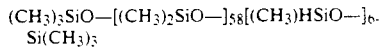
(CH$_3$)$_3$SiO—[(CH$_3$)$_2$SiO—]$_{58}$[(CH$_3$)HSiO—]$_6$·Si(CH$_3$)$_3$ with addition of 400 mL of toluene (of this amount, 150 mL for azeotropic drying) in the presence of 0.21 g of a 10% solution of H$_2$PtCl$_6$·6 H$_2$O in i-propanol. An SiH conversion of 98.7% was attained. The product is clear and yellowish and has a viscosity of 1,790 mPa x sec.

2. Synthesis of a Stabilizer c) with the Polyether Blocks of the European Publication 0 275 563

Stabilizer c)

In the same way as for the synthesis of stabilizers a) and b), 73.6 g (=0.05 moles) of a polyether having the average formula

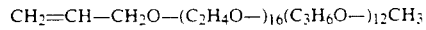
CH$_2$=CH—CH$_2$O—(C$_2$H$_4$O—)$_{16}$(C$_3$H$_6$O—)$_{12}$CH$_3$ corresponding to the polyoxyalkylene group A as described above on page 7 (with a molecular weight of 1,472), 125.3 g (=0.03125 moles) of a polyether having the average formula

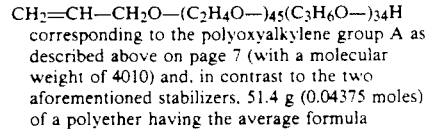
CH$_2$=CH—CH$_2$O—(C$_2$H$_4$O—)$_{45}$(C$_3$H$_6$O—)$_{34}$H
corresponding to the polyoxyalkylene group A as described above on page 7 (with a molecular weight of 4010) and, in contrast to the two aforementioned stabilizers, 51.4 g (0.04375 moles) of a polyether having the average formula

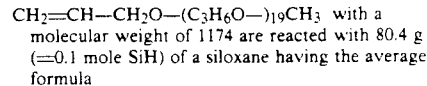
CH$_2$=CH—CH$_2$O—(C$_3$H$_6$O—)$_{19}$CH$_3$ with a molecular weight of 1174 are reacted with 80.4 g (=0.1 mole SiH) of a siloxane having the average formula

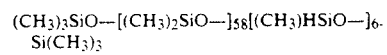
(CH$_3$)$_3$SiO—[(CH$_3$)$_2$SiO—]$_{58}$[(CH$_3$)HSiO—]$_6$·Si(CH$_3$)$_3$ with addition of 400 mL of toluene (of this amount, 150 mL for azeotropic drying) in the presence of 0.20 g of a 10% solution of H$_2$PtCl$_6$·6 H$_2$O in i-propanol. An SiH conversion of 98.2% was attained. The product is clear and yellowish and has a viscosity of 1.730 mPa x sec.

The difference of the comparison stabilizer c) lies in the low molecular weight of the third polyether. In the following Table, the property changes are shown, which may be observed upon comparing the two inventive stabilizers a) and b) with stabilizer c), which corresponds with the state of the art. For this comparison, foaming is carried out as in Example 11, with the difference that the polyol has a molecular weight of 3000 and that 10 parts by weight of blowing agent and 114 parts by weight of toluene diisocyanate are used for the foaming.

TABLE 2

| Stabilizer | Collapse | Head Pressure | Cells per cm |
|---|---|---|---|
| a of the invention | 1.0/1.2/2.6 | 31/22/17 | 15/14/14 |
| b of the invention | 0.8/0.9/1.4 | 95/92/81 | 14/12/12 |
| c not of the invention | 0.7/0.9/1.2 | 139/138/122 | 14/11/9 |

It can be inferred from Table 2 that the property profile of the foams, obtained with the inventive stabilizers a) and b) is better than the property profile of the foam obtained with the comparison stabilizer c).

We claim

1. In uniform-pore stabilized foam wherein the foam comprises a mixture of a polyether, water, diisocyanate, a blowing agent as well as a stabilizer, the improvement which comprises that the foam stabilizer comprises

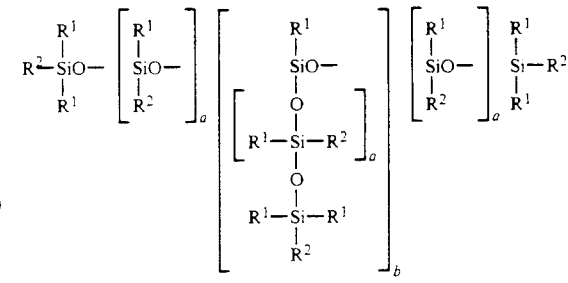

wherein
R$^1$ is an alkyl group with 1 to 4 carbon atoms or a phenyl group, with the proviso that at least 90% of the R$^1$ groups are methyl groups.
R$^2$ has the same meaning as R$^1$ or represents the —M—R$^3$ group, in which
M is a divalent group of the formula

—R$^4{}_x$O— wherein
R$^4$ is a divalent alkylene group, which may also be branched and x has a value of 0 or 1,
R$^3$ is a mixture of
(1) at least one polyoxyalkylene group A, and (2) at least one polyoxyalkylene group B and/or (3) at least one polyoxyalkylene group C., wherein each
polyoxyalkylene group A has an average molecular weight of 600 to 5,500 and consists of 20 to 90% by weight of oxyethylene units and 80 to 10% of oxypropylene units,
polyoxyalkylene group B has an average molecular weight of 500 to 5,000 and consists of 2 to 19% by weight of oxyethylene units and 98 to 81% by weight of oxypropylene units, polyoxyalkylene group C. has an average molecular weight of 1,500 to 4,500 and consists of oxypropylene units, up to 20% by weight of the oxypropylene units being replaceable in each case by oxybutylene units and the molar ratio of the polyoxyalkylene groups A to the sum of the polyoxyalkylene groups B and C being 1:4 to 4:1, with the proviso that, in an average block copolymer, at least one $R^3$ group is present, b has a value of 0 to 10, a has a value of 10 to 100, when $b = 0$ or a value of 3 to 70, when $b > 0$ and $\leq 4$, or a value of 3 to 30, when $b > 4$.

2. The block copolymer of claim 1, further comprising that the polyoxyalkylene block $R^3$ correspond to the formula $(C_mH_{2m}O-)_nR^5$, the subscripts n and m being selected so that the conditions with respect to the composition and respective molecular weight of the different polyoxyalkylene blocks are fulfilled, and $R^5$ is a hydrogen group, an alkyl group with 1 to 4 carbon atoms, an acyl group or an $-O-CO-NH-R^6$ group, wherein $R^6$ is an alkyl or aryl group.

* * * * *